US007330873B2

(12) United States Patent
Yoshida et al.

(10) Patent No.: US 7,330,873 B2
(45) Date of Patent: Feb. 12, 2008

(54) METHOD AND APPARATUS FOR ROUTING CALL AGENTS TO WEBSITE CUSTOMERS BASED ON CUSTOMER ACTIVITIES

(75) Inventors: Yoichi Yoshida, Machida (JP); Brian Pulito, Lexington, KY (US); James P. Galvin, Oak Ridge, NC (US); Kevin Solie, Lexington, KY (US)

(73) Assignee: International Buisness Machines Corporation, Armonk, NY (US)

( * ) Notice: Subject to any disclaimer, the term of this patent is extended or adjusted under 35 U.S.C. 154(b) by 772 days.

(21) Appl. No.: 10/226,425

(22) Filed: Aug. 23, 2002

(65) Prior Publication Data

US 2004/0039775 A1 Feb. 26, 2004

(51) Int. Cl.
*G06F 15/16* (2006.01)
*G06F 15/00* (2006.01)
(52) U.S. Cl. .................... 709/203; 217/218; 217/219
(58) Field of Classification Search ........ 709/200–203, 709/217–219; 719/314; 706/10; 379/365.01
See application file for complete search history.

(56) References Cited

U.S. PATENT DOCUMENTS

| | | | | |
|---|---|---|---|---|
| 5,715,453 A | * | 2/1998 | Stewart | 715/513 |
| 5,884,032 A | * | 3/1999 | Bateman et al. | 709/204 |
| 6,064,730 A | * | 5/2000 | Ginsberg | 379/265.09 |
| 6,094,673 A | * | 7/2000 | Dilip et al. | 709/202 |
| 6,163,536 A | * | 12/2000 | Dunn et al. | 370/352 |
| 6,366,575 B1 | * | 4/2002 | Barkan et al. | 370/352 |
| 6,549,889 B2 | | 4/2003 | Lauffer | |
| 2002/0143550 A1 | * | 10/2002 | Nakatsuyama | 704/270.1 |
| 2002/0161896 A1 | * | 10/2002 | Wen et al. | 709/227 |
| 2003/0126206 A1 | * | 7/2003 | Dezonno et al. | 709/204 |

OTHER PUBLICATIONS

A Real-Time Multi-Agent System Architecture for E- Commerce Applications, DiPuppo, L.C., et. al. IEEE 0-7695-1065-5/01, p. 357-364.*
Industrial-Strength Conversations, Unruh, A., et. al., p. 1-10.*

(Continued)

*Primary Examiner*—Zarni Maung
(74) *Attorney, Agent, or Firm*—McGuinness & Manaras LLP

(57) ABSTRACT

A system for allowing call center agents to initiate text chat, audio and/or video communication, as well as collaborative browsing with potential customers visiting web pages includes a customer monitoring applet that monitors the behavior of the customer via the web browser and sends information to a router process, the information including information identifying the customer, the web page location, status of a transaction, etc. The router process uses the information supplied to it from the customer monitoring applet, as well as information on one or more available agent processes to determine which call agent would be appropriate to initiate contact with the potential customer. The router process transmits the information identifying the customer to the selected agent process for presentation to the agent. The agent can monitor the status of the customer, as well as other customers, and send a request to initiate communication, if appropriate. The router process uses a customer status database and an agent status database to determine which agent is appropriate for a particular customer.

22 Claims, 15 Drawing Sheets

OTHER PUBLICATIONS

Object lessons learned from an intelligent agents framework for telephony-based applications, Yannakopoulos, D., et. al., Technology of Object-Oriented Languages & Systems, Aug. 1999, TOOLS 30, p. 222-236.*

Agent-based Adaptive Selection and Interaction to Z39-50 Servers, Fernandez, C., et. al., IEEE 1089-6503/00, p. 102-109.*

Taking Advantage of real-time collaboration tools, Coleman, D., et. al. IT Professional, Jul./Aug. 1999, vol. 1, issue 4, ISSN 1520-9202, p. 25-30.*

* cited by examiner

METHOD AND APPARATUS FOR ROUTING CALL AGENTS TO WEBSITE CUSTOMERS BASED ON CUSTOMER ACTIVITIES

FIELD OF THE INVENTION

This invention relates, generally, to data processing systems and, more specifically, to a technique for initiating communications from call agents to website customers based on customer activities.

RELATED APPLICATIONS

This application is co-pending and commonly assigned with the following U.S. patent applications all filed Oct. 24, 2000, the subject matters of which are incorporated herein by reference for all purposes, including the following:

U.S. patent application Ser. No. 09/695,193, entitled "Method and Apparatus for Providing Full Duplex and Multipoint IP Audio Streaming";

U.S. patent application Ser. No. 09/695,553, entitled "Method and Apparatus for Multi-mode IP Audio Streaming";

U.S. patent application Ser. No. 09/695,203, entitled "Method and Apparatus Two-way Distributed Audio Mixing of Multiway Calls".

BACKGROUND OF THE INVENTION

In the new paradigm created by the Internet and online shopping, analogies may be drawn to traditional shopping in brick and mortar businesses. In cyberspace, web browsers or web surfers play the roles of traditional customers. Websites, particularly those selling goods and/or services, play the roles of traditional stores and vendors. Call center agents, reachable either through traditional circuit-switched telephone lines or through internet telephony equipped call centers, play the roles of sales agents or clerks. In a traditional store, if a potential purchaser spent a significant amount of time examining a product or repeatedly returned to view a product, a sales clerk would typically offer to assist the potential purchaser to answer any questions. In the online shopping experience, however, requests for assistance are typically initiated not by the vendor's agents, but by the web browsing customers, with the customer typically calling a 1-800 number listed on a web page when questions arise regarding a particular good or service. This phenomena, is due in part, to the inability of online vendors to observe the browsing habits of potential customers at a website. As a result, the portion of sales revenue typically resulting from assistance offered by sales agents is lost by on-line vendors.

According, a need exists for a way in which an on-line vendor can monitor the activity of a potential website customer, while on-line.

A further need exists for a technique in which call center agents can initiate contact with a website customer while browsing a particular website.

A further need exists for the ability to determine the skill level necessary to render assistance to a particular website customer based on the web page and/or activities of the customer while online.

SUMMARY OF THE INVENTION

The present invention provides a system and technique which enables a call center agent to monitor the behavior of a potential customer when visiting a website and, if appropriate, to initiate communication with the potential customer to possibly render assistance. A system in accordance with the present invention includes three main components. First, a program or applet running in or in conjunction with a customer web browser or a web site. Second, a router process running at a server operatively connected over a computer network to the applet and which interacts with the applet. Third, an application running at an agents terminal which interacts with the router process. The applet monitors customer behavior and sends status information to the router process including data identifying the customer, such as account IDs, user IDs, etc. and a skill level indicator, depending possibly on which web page a customer was visiting at a particular website. The applet is also able to receive a request indicating that an agent is willing to help the customer with text chat or collaborative web browsing, etc. as required. The router process executes at a server over a network and receives the information from the applet. The router process determines which agent is appropriate to render assistance by determining the skill level required, the current availability of agents, any related customer information, such as customer value, frequency of customer visits, new customer status, etc. The application executing on the agent system receives the customer information from router process and displays it for the agent, enabling the agent to make a determination as to whether it is appropriate to offer assistance to the web customer via text chat, audio and/or video, and/or collaborative web browsing, etc.

According to one aspect of the invention, in a computer system having a processor, memory and network interface and being operatively coupled over a computer network to one or more web browsers processes, a method comprises: (A) receiving information from a monitoring process executing in association with one of the web browser processes, the information identifying the web browser process and at least a portion of the web site to which said one web browser process is connected; (B) determining from the information identifying the web browser process, which of a plurality of on-line agent processes should establish a communication connection with the web server process; (C) transmitting the information identifying the web server to said one agent process; and (D) establishing a communication connection between the web browser process and said one agent process using the information identifying the web browser process. In one embodiment, the process of establishing a communication comprises: establishing any of a text chat, real-time audio, real-time video, and collaborative browsing communication connection with the web browser process using the information identifying the customer process. In another embodiment, the information identifying the web browser process comprises any of customer id, web page URL, TypeOfGoods, Customer status, and Current Agent information.

According to a second aspect of the invention, a computer program product for use with a computer system operatively coupled over a computer network to one or more web browsers processes, the computer program product comprising a computer useable medium having embodied therein program code comprising: (A) router program code for receiving information from a monitoring process executing in association with one of the web browser processes, the information identifying the web browser process and at least a portion of the web site to which said one web browser process is connected; (B) program code for determining from the information identifying the web browser process, which of a plurality of on-line agent processes should establish a communication connection with the web server process; (C) program code for transmitting the information identifying the web server to said one agent process; and (D) program code for establishing a communication connection between the web browser process and said one agent process using the information identifying the web browser process.

According to a third aspect of the invention, an apparatus for use with a computer system having a processor, and a network interface and being operatively coupled over a computer network to one or more web browsers processes, the apparatus comprises: (A) a memory for maintaining information associated with a plurality of on-line agent processes; (B) program logic for receiving information from a monitoring process executing in association with one of the web browser processes, the information identifying the web browser process and at least a portion of the web site to which said one web browser process is connected; (C) program logic for determining from the information identifying the web browser process, and information associated with a plurality of on-line agent processes which of the plurality of on-line agent processes should establish a communication connection with the web server process; and (D) program logic for transmitting the information identifying the web browser process to said one agent process.

According to a fourth aspect of the invention, in a computer system having a processor, memory and network interface and being operatively coupled over a computer network to one or more web browsers processes, a method comprises: (A) maintaining, in the memory, information associated with a plurality of on-line agent processes; (B) receiving information from a monitoring process executing in association with one of the web browser processes, the information identifying the web browser process and at least a portion of the web site to which said one web browser process is connected; (C) determining from the information identifying the web browser process, and information associated with a plurality of on-line agent processes which of the plurality of on-line agent processes should establish a communication connection with the web server process; and (D) transmitting the information identifying the web browser process to said one agent process.

According to a fifth aspect of the invention, a computer program product for use with a computer system operatively coupled over a computer network to one or more web browsers processes, the computer program product comprising a computer useable medium having embodied therein program code comprising: (A) router program code for receiving information from a customer process executing in association with the web browser process, the information identifying the customer process and at least a portion of the web site to which the associated web browser process is connected; (B) program code for determining from the information identifying the customer process, which of a plurality of on-line agents is appropriate to render assistance to the customer process; and (C) program code for transmitting the information identifying the customer process to agent program code.

According to a sixth aspect of the invention, in a computer system having a processor, memory and network interface and being operatively coupled over a computer network to a router process and capable of executing a collaborative communication process and a web browser process, a method comprises: (A) monitoring a web site accessed by a the web browser process; and (B) forwarding to the router process information identifying the web browser process and at least a portion of the web site to which the web browser process is connected.

According to a seventh aspect of the invention, a computer program product for use with a computer system operatively coupled over a computer network to a router process and capable of executing a collaborative communication process and a web browser process, the computer program product comprising a computer useable medium having embodied therein program code comprising: (A) program code for monitoring the web site accessed by a the web browser process; (B) program code for forwarding to the router process information identifying the web browser process and at least a portion of the web site to which the associated web browser process is connected.

According to an eight aspect of the invention, in a computer system having a processor, memory and network interface and being operatively coupled over a computer network to a router process and one or more customer systems executing a collaborative communication process and a web browser process, a method comprises: (A) receiving the information identifying the customer system from the router process; and (B) initiating a communication connection with the customer system using the collaborative communication process and the information identifying the customer system.

According to a ninth aspect of the invention, a computer program product for use with a computer system operatively coupled over a computer network to a router process and one or more customer systems executing a collaborative communication process and a web browser process, the computer program product comprising a computer useable medium having embodied therein program code comprising: (A) program code for receiving the information identifying the customer system from a router process; and (B) program code for initiating a communication connection with the customer system using the collaborative communication process and the information identifying the customer system. In one embodiment, the process of establishing a communication comprises: establishing any of a text chat, real-time audio, real-time video, and collaborative browsing communication connection with the web browser process using the information identifying the customer process.

BRIEF DESCRIPTION OF THE DRAWINGS

The above and further advantages of the invention may be better understood by referring to the following description in conjunction with the accompanying drawings in which.

DETAILED DESCRIPTION

Figure 1:
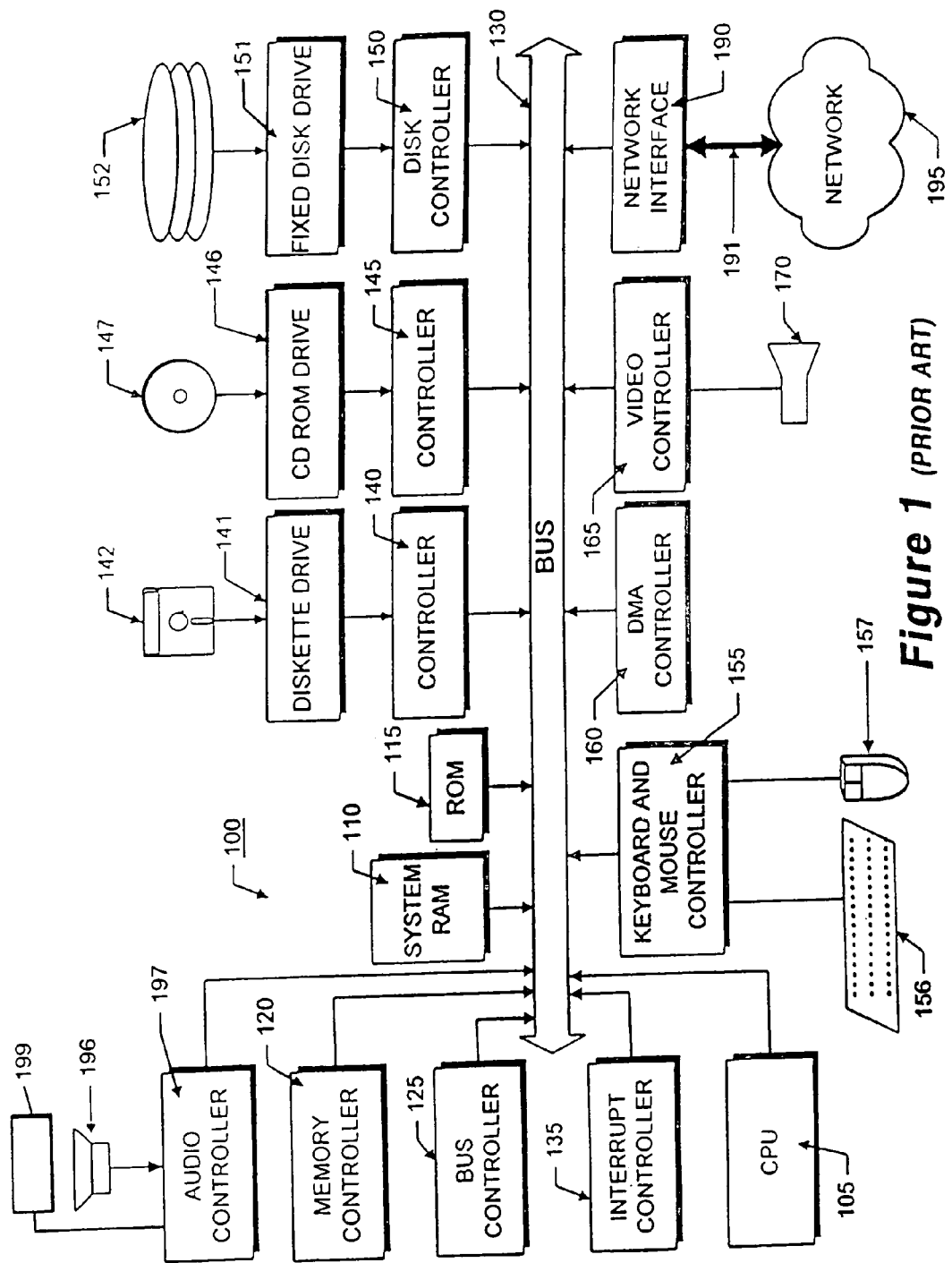
FIG. 1 is a block diagram of a computer systems suitable for use with the present invention.

FIG. 1 illustrates the system architecture for a computer system 100, such as a Dell Dimension 8200, commercially available from Dell Computer, Dallas Tex., on which the invention can be implemented. The exemplary computer system of FIG. 1 is for descriptive purposes only. Although the description below may refer to terms commonly used in describing particular computer systems, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic use interface presented thereon by an application or the operating system, in addition to or in combination with any keyboard, pointing device, joystick, voice recognition system, speakers, microphone or any other mechanism through which the user may interact with the computer system.

Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such as the WINDOWS NT, WINDOWS XP or WINDOWS 2000 operating system, available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including OS/2, AIX, UNIX and LINUX, DOS, etc. One or more applications 220 such as Lotus Notes or Lotus Sametime, both commercially available from Lotus Brand Software, International Business Machines Corp., Cambridge, Mass., may execute under control of the operating system. If operating system 210 is a true multitasking operating system, multiple applications may execute simultaneously.

In the illustrative embodiment, the present invention may be implemented using object-oriented technology and an operating system which supports execution of object-oriented programs. For example, the inventive code module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

System Overview

Figure 2:
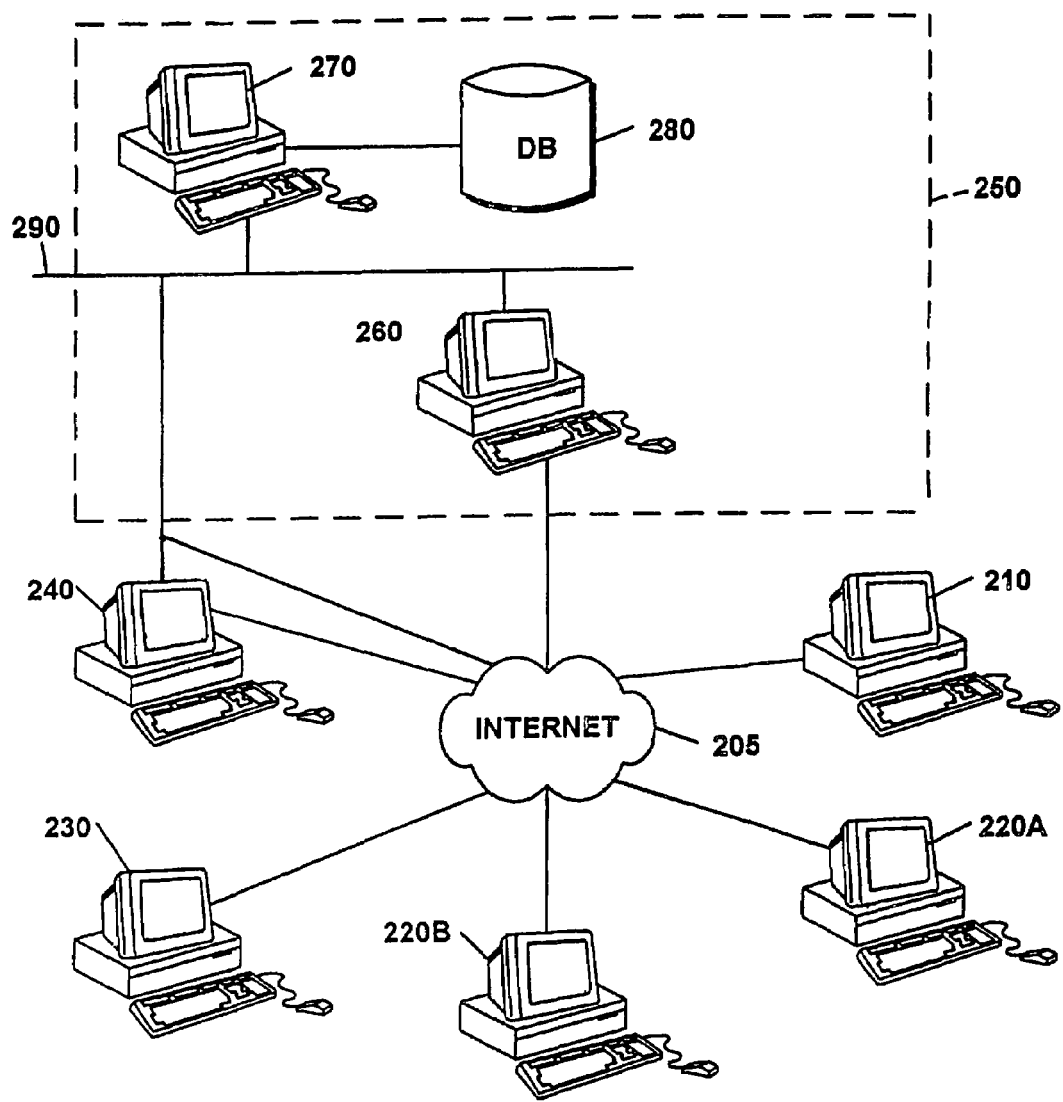
FIG. 2 is a conceptual block diagram of a network environment in which the system of the present invention may be implemented.

Referring to FIG. 2, illustrates conceptually a network topology in which the commerce assistance system 250 of present invention may be implemented. Specifically, a publicly accessible, wide area network topology, such as the Internet, labeled 205, operatively couples a plurality of systems, and their respective executing process, including customer/shopper processes 220A-B, agent processes 210 and 230, vendor web server 240, router server 260, database server 270 and database 280. The commerce assistance system 250 of the present invention, highlighted in phantom, comprises an agent system 210, router server 260, database server 270 and database 280, as illustrated. In addition, private network 290 may further couple router server 260, database server 270 directly to a vendor web server 240, as well as to network 205. Optionally, router server 260 may be coupled to a circuit-switched telephone network through IVR system (not shown). All of the system illustrated in FIG. 2 may execute on hardware platforms which may be similar to that described with reference to FIG. 1.

In the illustrative embodiment, vendor web server 240 performs the functions of a traditional web server enabling access to one or more web pages by customer/shopper processes 220A-B connected to Internet 205. One or more of the pages accessible on web server 240 may contain address information in the form of a Hypertext Markup Language (HTML) tag which may be downloaded over the Internet 205 to a browser process executing on any of the customer/shopper system 220A-B.

Customer Monitoring Applet

Figure 3A:
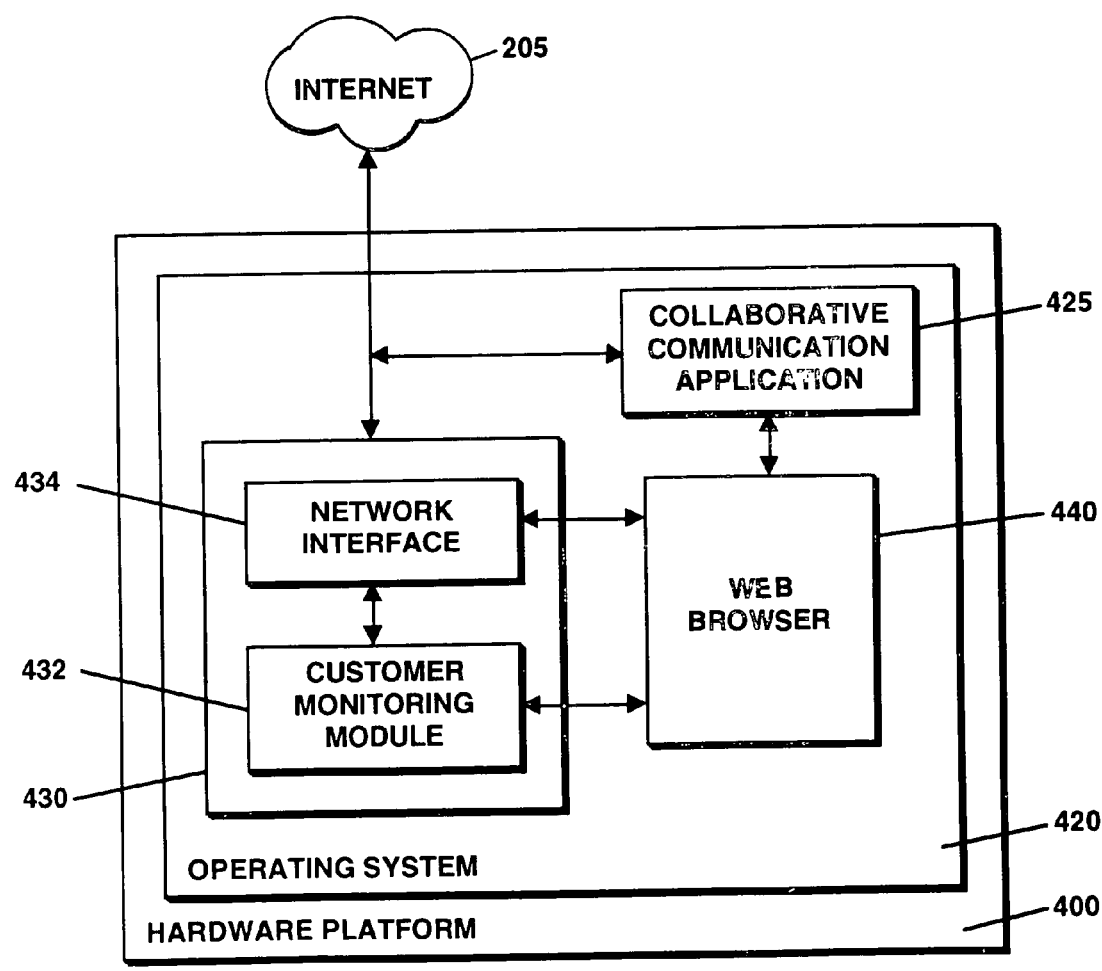
FIG. 3A is a block diagram illustrating conceptually the relationship between the components of the customer system and a customer monitoring applet in accordance with the present invention.

One of customer/shopper system 220A-B is shown in FIG. 3A. Customer system 220 comprises a hardware platform 400 which may be implemented using a computer architecture similar to that illustrated with reference to FIG. 1. Hardware platform 400 includes a network interface, such as a Ethernet LAN card or other LAN-based TCP/IP network connector, for interfacing system 220 with the Internet. Hardware platform 400 executes a computer operating system 420, such as Windows NT 4.0, available from Microsoft Corporation, Redmond, Wash. Execution under the control of operating system 420 is web browser application 440, a collaborative communication application 425 and customer monitoring applet 430. Customer monitoring applet 430 implements the algorithms that monitor the activities of a customer, as described hereafter.

A web browser 440 and customer monitoring applet 430 execute under the control of operating system 420 which in turn executes within the hardware parameters of hardware platform 400. In the illustrative embodiment, applet 430 works seamlessly with any number of commercially available Java enabled web browser that provide standard JavaScript support, such as NetScape Navigator version 4.5 and above, commercially available from America On-line, Reston, Va.; Microsoft Internet Explorer version 4.0, commercially available from Microsoft Corporation, Redmond, Wash. Alternatively, applet 430 may execute in conjunction with the Sametime collaborative communication program, described in greater detail hereinafter, or other collaborative communication programs that are Java enabled and have standard JavaScript support.

In the illustrative embodiment, the applet 430 can be downloaded from vendor web server 240 which the customer is visiting or an intermediate web server. Upon visiting a page at a web site, a potential customer is asked via the browser process if they would like on-line help. If the customer responds affirmatively, applet 430 will be downloaded from the web server or the intermediate web server. Alternatively, applet 430 may be shipped as part of the customer web browser 440.

Figure 3B:
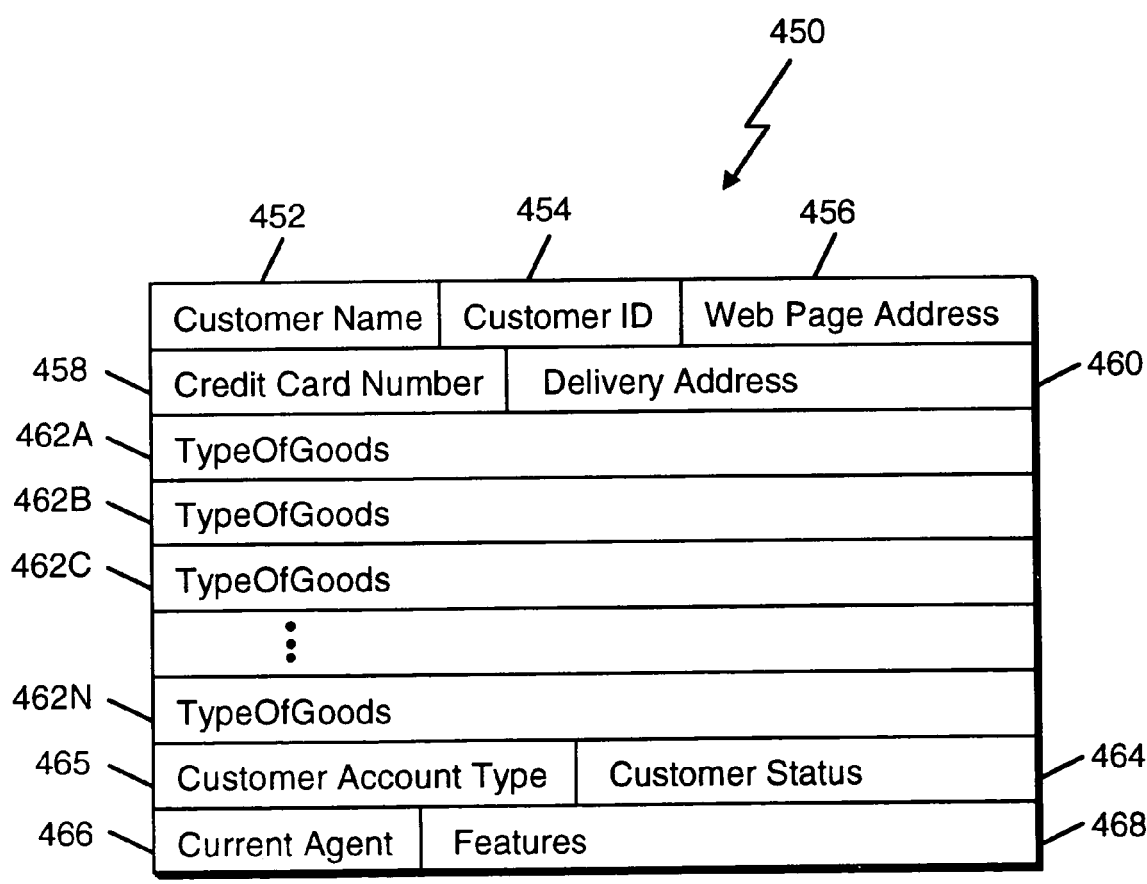
FIG. 3B is a conceptual diagram of a customer information data structure in accordance with the present invention.
Figure 4:
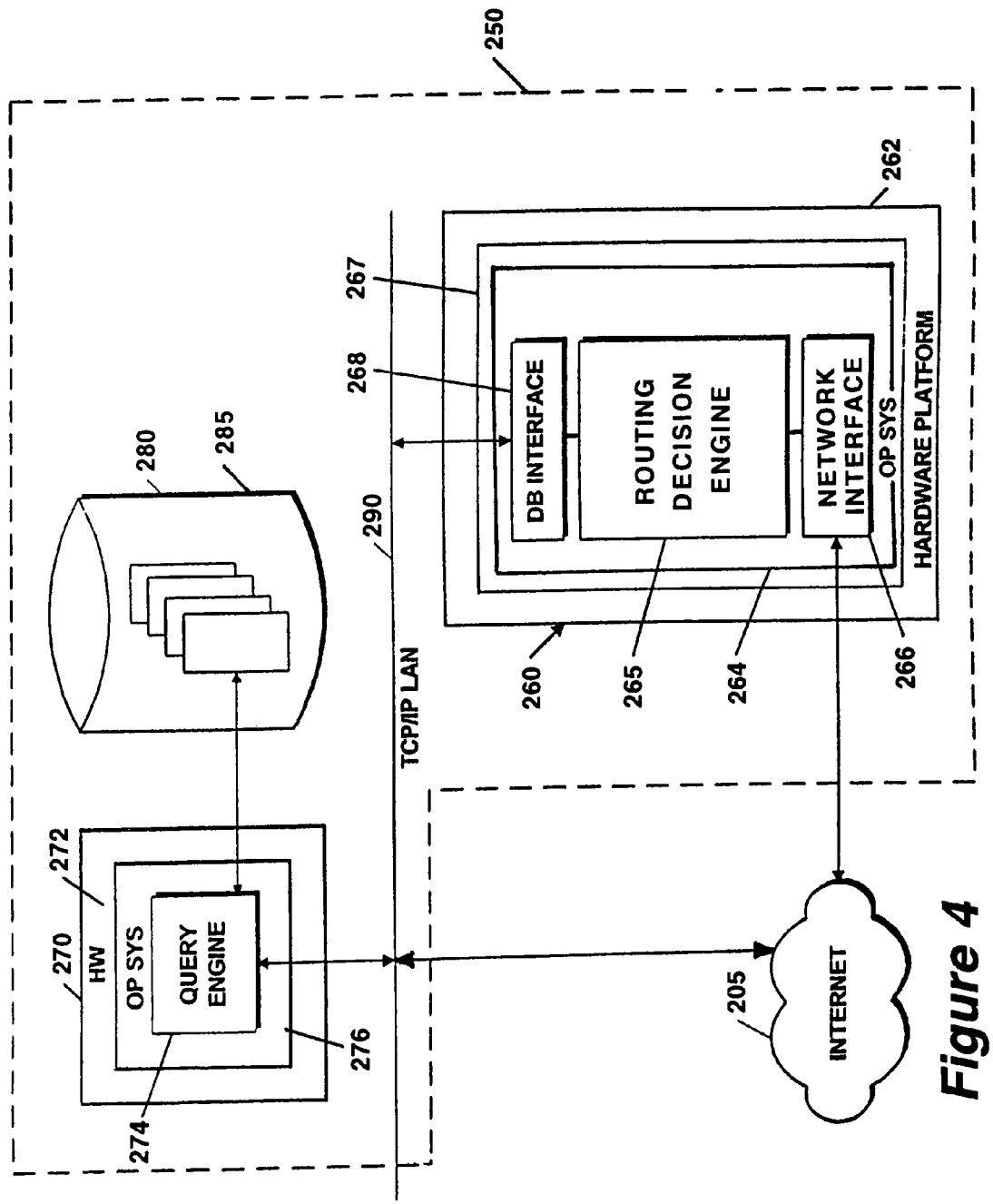
FIG. 4 is a conceptual block diagram illustrating the elements of the inventive router and database in accordance with the present invention.

Customer monitoring applet 430 may be implemented as a combination of Java applet and JavaScript code which executes in conjunction with customer web browser 440. Applet 430 includes a monitoring module 432 and a network interface module 434. Once installed, as the customer browses, the monitoring module 432 monitors the following information through calls to the web browser process: 1) Customer related information such as customer name and customer id; 2) Location related information in the web site such as web page address, typically in URL format; and 3) Stage related information in case of web commerce site such as what's in the "shopping basket" and whether a the customer has input a credit card number, or delivery address. FIG. 3B illustrates a data structure 450 useful to applet 430 for storing customer, location and stage related information. Specifically, data structure 450 comprises customer name field 452, customer ID field 454, web page address 456; credit card number field 458, delivery address field 460, and TypeOfGoods fields 462A-N. The TypeOfGoods fields 462 can be used to represent the vendor and either a single product or a category of products, as necessary. In addition, data structure 450 includes Customer Account Type field 465 used to indicate an account type (e.g., premier gold, premier, standard, etc), a Customer Status field 464 indicating where a customer is in the purchase process (e.g., no goods in basket, putting goods into basket, inputting credit card number, making final confirmation on shopping), a Current Agent field 466 indicating which, if any, agent is currently monitoring the customer, and an optional Features field 468 indicating the type and features of any collaborative communication software present on the customer system. In the illustrative embodiment, the fields within data structure 450 may be represented in XML format and may be transmitted periodically from applet 430 to router process 260 over the network using TCP/IP protocol. Network interface module 434 includes the appropriate code to make calls to web browser 440 to collected the information described in data structure 450 and to transmit the same to router server 260, as described hereafter.

Route Server

In the illustrative embodiment, the router server 260 may be implemented as a server application 264 which receives data from the customer monitoring applet 430 and interacts with an agent status database 285, a customer status database 280, and, in some implementations, directly with the vendor server 240 to obtain the information related to what a potential customer is trying to buy. Server 260 may also function as a proxy server for LAN 290 to which computer 260 may connected via a LAN-based TCP/IP network connector.

Route server 260 comprises a hardware platform 262 which may be implemented using a computer architecture similar to that illustrated with reference to FIG. 1. Hardware platform 262 includes a network interface for interfacing server 260 with the Internet, for example, through a T1 line. Hardware platform 262 may include an optional second interface for connecting server 260 to private network 290. Such an optional second interface may be implemented with an Ethernet LAN card or other LAN-based TCP/IP network connector. The hardware construction of such connectors and cards, as well as their appropriate drivers and protocols which implement the various transport protocol layers are well known within the art and will not be described herein in detail. Hardware platform 262 executes a computer operating system 267, such as Windows NT 4.0, available from Microsoft Corporation, Redmond, Wash. Such an operating system is a multi-tasking operating system capable of executing multiple simultaneous threads of execution. Execution under the control of operating system 267 is router application 264 including network interface 266, database interface 268 and routing decision engine 265. Database interface 268 functions as the interface between routing decision engine 265 and database server 270. Database interface 268 may be implemented with the appropriate Remote Procedure Call library which enables the interface to make remote procedural calls to database server 270 and to service calls received from database server 270. Routing decision engine 265 implements an algorithms that determines to which agent to refer a customer process. In the illustrative embodiment, the functions performed by the router process 264 may be implemented either with object-oriented programming techniques using the appropriate class definitions and objects for values within the database, or, alternatively, using a non-object oriented language such as the UNIX programming language.

The algorithm performed by routing decision engine module 265 to determine which agent to refer a customer process attempts to match customer and agent characteristics. Routing decision engine 265 utilizes any of tests or comparisons to match a customer record with an agent record. Assuming an agent can handle another customer, decision engine 265 first begins to compare the value of the Customer Account Type field 562 of record 550 with the Skill Level field 576 of record 590 of each available agent in an attempt to match the most valuable customer with the most skilled agents. To assist with the matching process the decision engine may utilize one of more rules that define relationships between skill levels and certain customer account types. For example, a rule may match the Skill Area code associated with outdoor equipment with TypeofGoods codes associated with either camping gear or outdoor sports. Next, if no match occurs, the decision engine 265 attempts to match the type of good field(s) 562a-n of record 550 with the Skill Area field 574 of the agent record 590. To assist with the matching process the decision engine may utilize one of more rules that define relationships between skill areas and certain types of goods. For example, a rule may match the Skill Area code associated with outdoor equipment with TypeofGoods codes associated with either camping gear or outdoor sports. Finally, if no matches occur according to the prior criteria or there are no goods within the customer's shopping cart or "basket", decision engine 265 then attempts to match the web page address field 556 of record 550 with the Skill Area field 574 of record 590. Again, to assist with the matching process the decision engine may utilize one of more rules that define relationships between certain web page addresses and certain skill areas. For example, a rule may match the Skill Area code associated with outdoor equipment with all or a part of the web page addresses or identifiers thereof of certain camping gear or outdoor sports vendors who have registered with the system. These processes are described in greater detail with reference to FIGS. 10A-B. Once routing decision engine 265 determines which agent process is able to handle a customer, the router 260 transmits to the selected agent system the information described in data structure 550 in XML format over the network using TCP/IP protocol.

Data Base Architecture

Database server 270 and database 280 comprise the system by which the database information and data structures of the present invention are implemented. Specifically, database server 270 comprises a database hardware platform 272, an operating system 274 and a database query application 274. In the illustrative embodiment, hardware platform 272 is implemented with a computer system similar to that described with reference to FIG. 1. Operating system 276 may be implemented with Windows NT 4.0. The database query application 276 may be implemented with any number of commercially available database search query language engines, such as Microsoft SQL Server Version 7.0, also commercially available from Microsoft Corporation. The structure of information, including the data structure, records and various data use to access records as described hereinafter may also be designed and implemented using MicroSoft SQL Server Version 7.0.

As described previously, route server 260 and database server 270 may be operatively coupled through a public or private network, such as a transmission Control Protocol/Internet Protocol (TCP/IP) based network. Query engine 276 receives information from web server 260 in the form of a query and supplies the query to databases 280. The structure and organization of records within database 280 is set forth in greater detail with reference to FIG. 5A-B. Database server 270 and database 280 may communicate using SQL standard database query language. The SQL standard is published by the American National Standards Institute (ANSI). The information retrieved from database 280 is forwarded by database server 270 to web server 260 using remote procedural call libraries such as that previously described.

Figure 5A:
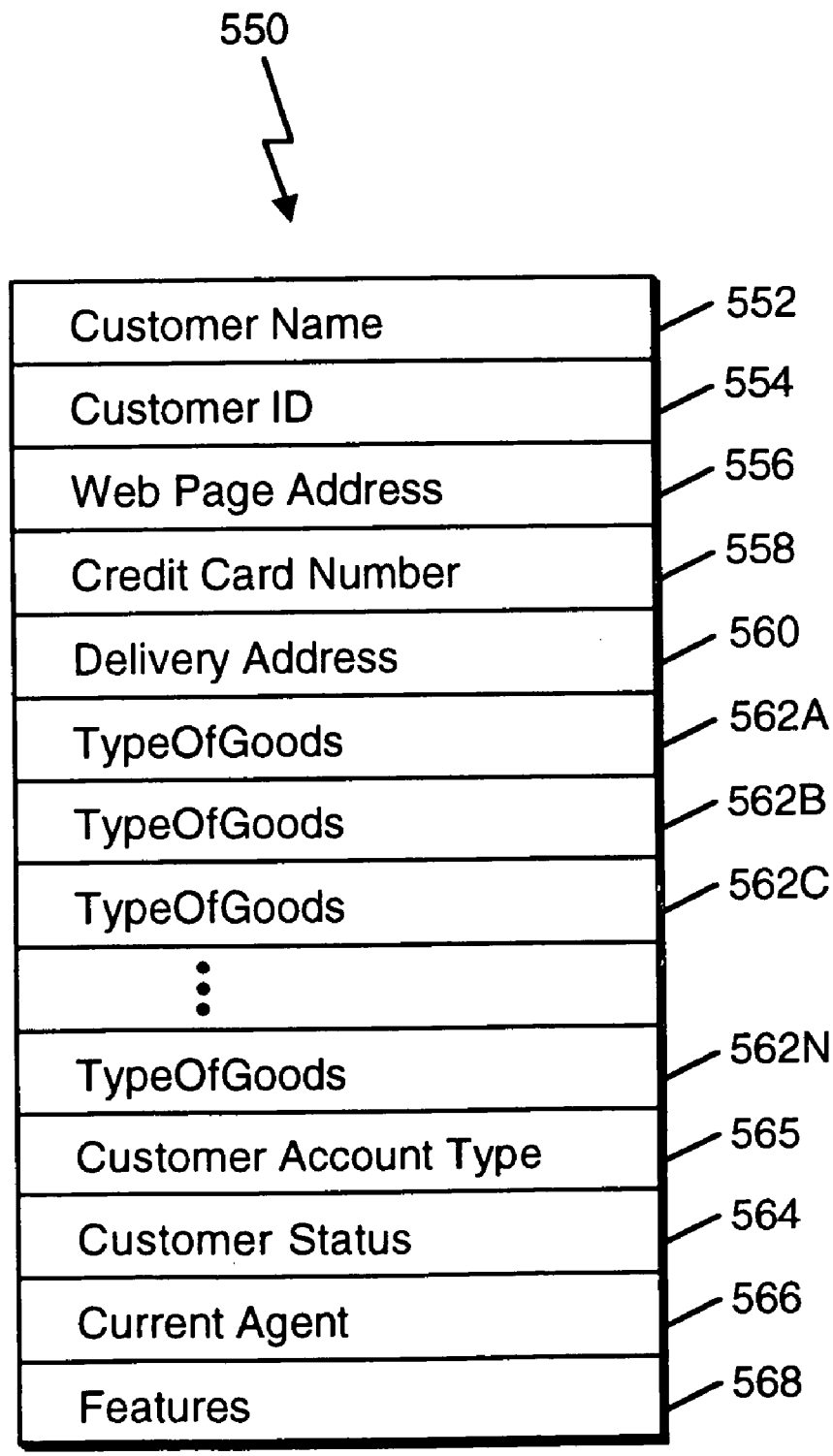
FIG. 5A-B are illustrate conceptually data structures in accordance with the present invention.
Figure 5B:
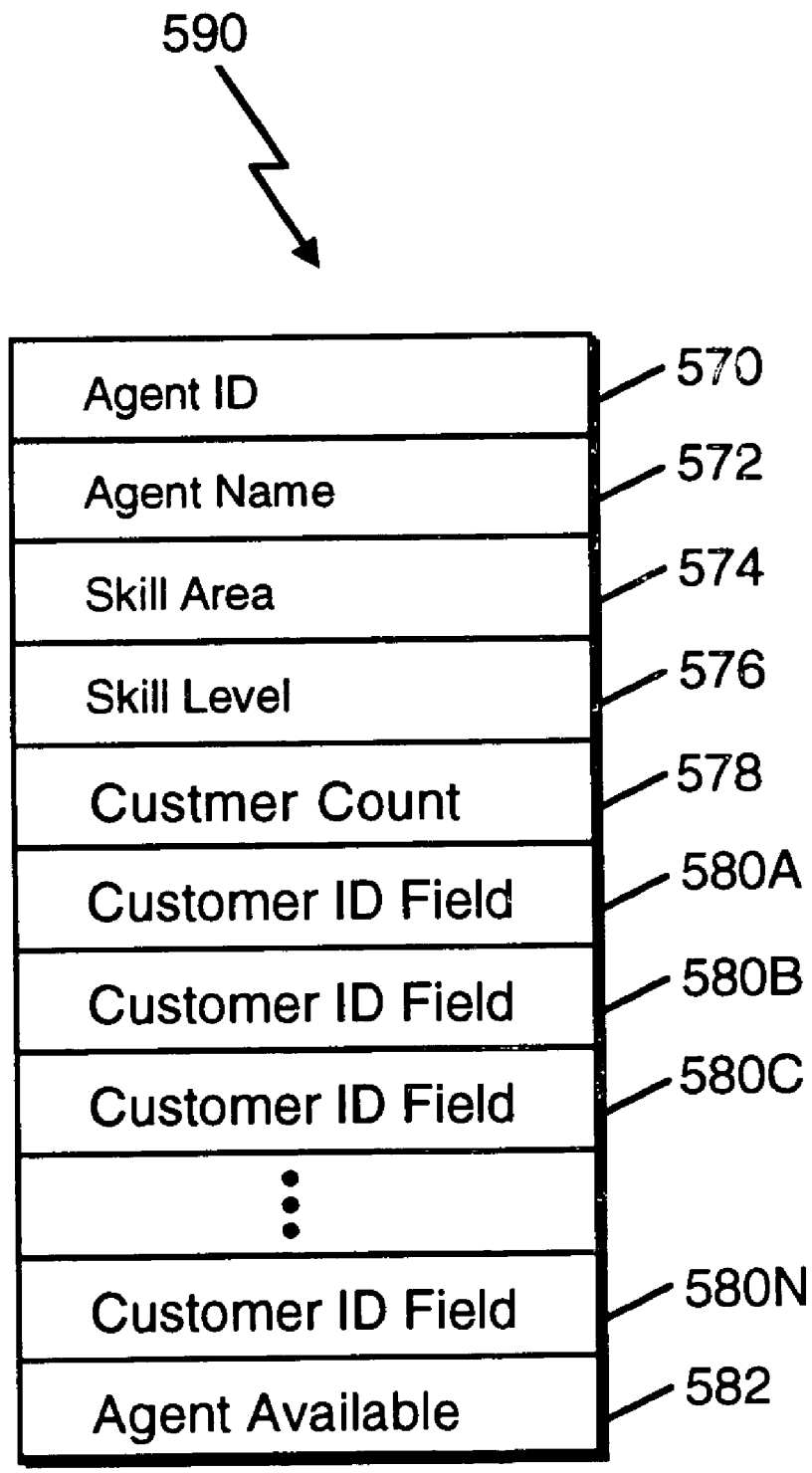

Referring to FIGS. 5A and B, the arrangement of data within databases 280 and 285 are illustrated conceptually. The customer database 280 maintains information about the customer processes in the system. The record/table structure 550 of the database 280 used to track customer process status includes all of the information in data structure 450. Specifically, table 550 comprises customer name field 552, customer id field 554, web page address 556; credit card number field 558, delivery address field 560, and TypeOfGoods fields 562A-n. The TypeOfGoods fields can be used to represent the vendor and either a single product or a category of products, as necessary. In addition, table 550 includes Customer Account Type field 565 used to indicate an account type (e.g., premier gold, premier, standard, etc), a Customer Status field 564 indicating where a customer is in the purchase process (e.g., no goods in basket, putting goods into basket, inputting credit card number, making final confirmation on shopping), a Current Agent field 566 indicating which agent is currently monitoring the customer, and an optional Features field 568 indicating the type and features of any collaborative communication software present on the customer system. In addition, database 280 maintains global data in a master record (not shown) that is not specific to a particular client record such as Customers Monitored field 568, indicating how many customers are being monitored.

The agent status database 285 maintains information about the agent processes currently online. The record/table structure 590 of the database 285 used to track individual agent process status includes Agent id filed 570, Agent name field 572, Skill Area file 574 (e.g., identifies the types of goods on the vendor web site that the agent is knowledgeble), Skill level field 576 (1 through 5, larger digit is better), Customer Count filed 578 identifying how many customers the agent is currently monitoring, Customer id fields 580A-N indicating the ids of the customers being monitored, and an Agent Available 582 filed indicating if the agent if available. In addition, database 285 maintains global data in a master record (not shown) that is not specific to a particular agent record such as Agents Available field 584, indicating how many agents are currently on line.

Although databases 280 and 285 are illustrated in FIG. 5 as part of the same database, it will be obvious to the reasonably skilled in the arts that separate data bases may be utilized. In addition, as an alternative to the embodiment shown in FIG. 5, database server 270 may be accessible directly from a network 205 in addition to or in place of access via LAN 290. The records used to hold information within databases 280 and 285 are time-stamped upon receipt of the data stored therein.

Agent Application

Figure 6:
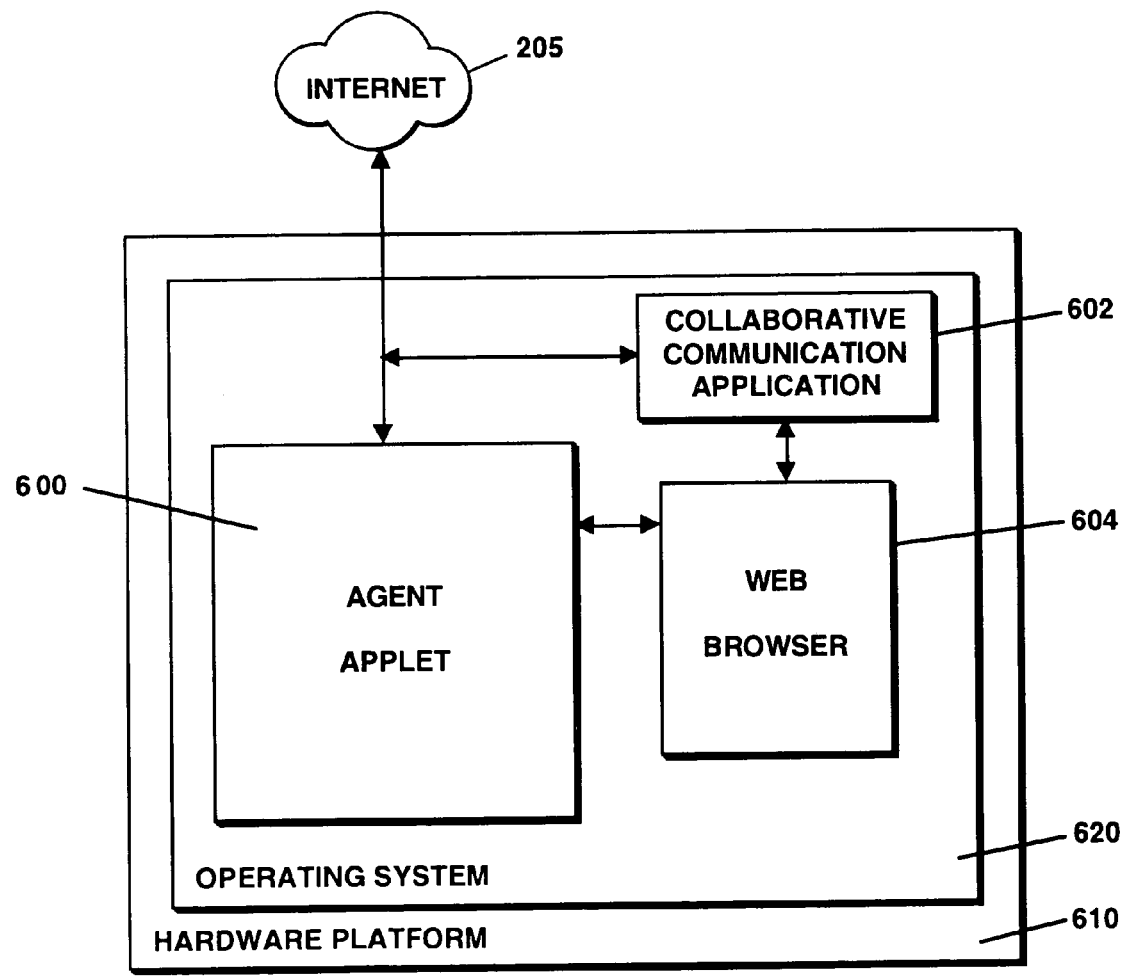
FIG. 6 is a block diagram illustrating conceptually the relationship between the components of the agent applet and a collaborative communication application in accordance with the present invention.

FIG. 6 illustrates conceptually an agent system and the relationship of the components therein. Agent system 230 comprises a hardware platform 610 which may be implemented using a computer architecture similar to that illustrated with reference to FIG. 1. Hardware platform 610 includes a network interface, such as a Ethernet LAN card or other LAN-based TCP/IP network connector, for interfacing system 230 with the Internet. Hardware platform 610 executes a computer operating system 620, such as Windows NT 4.0, available from Microsoft Corporation, Redmond, Wash. Execution under the control of operating system 620 is an agent applet 600, collaborative communication application 602, and a web browser 604.

In the illustrative embodiment, the agent applet 600 may be implemented as an applet which interacts with the customer through the collaborative communication software 602, e.g., Sametime, as well as the customer status database 280, agent status database 285 and the router server 260. Agent applet 600 may be implemented as a combination of Java applet and JavaScript code which executes in conjunction with collaborative communication software 602. Agent applet 600 periodically transmits to router server 260, in XML format using TCP/IP protocol, the information contained in record 590 for storage in agent status database 285.

Such data is used by router server 260 to determine to which customer the agent should be directed. Router server 260 then transmits to the agent applet 600, in XML format using TCP/IP protocol, a reference to the relevant data/record within customer database 280 so that the agent may review the customer status and initiate contact with the customer, as appropriate. Alternatively, router server 260 may periodically transmit to agent applet 600 some or all of the data in record 510 describing a particular customer. Such information may be stored locally on agent system 230 along with other data from other customers. Agent applet 600 includes the appropriate code to store and display the customer data contained the relevant data/record received from customer database 280. In addition, agent applet 600 periodically transmits to either router server 260 or directly to agent database 285, data relating to the status of the agent system 230. Once the human agent operator has reviewed the customer data, communication between the agent operator and a human customer is conducted using collaborative communication software 602, e.g., Sametime. Such communications may include any of text chat, real-time audio and/or video conferencing, collaborative web browsing, etc., depending on the common functionality of the collaborative communication applications 425 and 602 of the customer system and agent system, respectively. The Sametime environment is described hereafter within the context of the present invention.

Sametime Environment

The illustrative embodiment of the present invention is described in the context of the Sametime family of real-time collaboration software products, commercially available from International Business Machines Corporation, Lotus Brand Software Division, Cambridge, Mass. The Sametime family of products provide awareness, conversation, and data sharing capabilities, the three foundations of real-time collaboration. Awareness is the ability of a client process, e.g. a member of a team, to know when other client processes, e.g. other team members, are online. Conversations are networked between client processes and may occur using multiple formats including instant text messaging, audio and video involving multiple client processes. Data sharing is the ability of client processes to share documents or applications, typically in the form of objects. The Sametime environment is an architecture that consists of Java based clients that interact with a Sametime server. The Sametime clients are built to interface with the Sametime Client Application Programming Interface, published by International Business Machines Corporation, Lotus Division, which provides the services necessary to support these clients and any user developed clients with the ability to setup conferences, capture, transmit and render audio and video in addition to interfacing with the other technologies of Sametime.

The present invention may be implemented so that the agent process interacts with the existing family of Sametime 1.0 or 1.5 products and thereafter. The customer monitoring applet may be designed to interact with any of the Sametime Server 300, the Sametime Connect client 310 and Sametime Meeting Room Client (MRC) 312.

Figure 7:
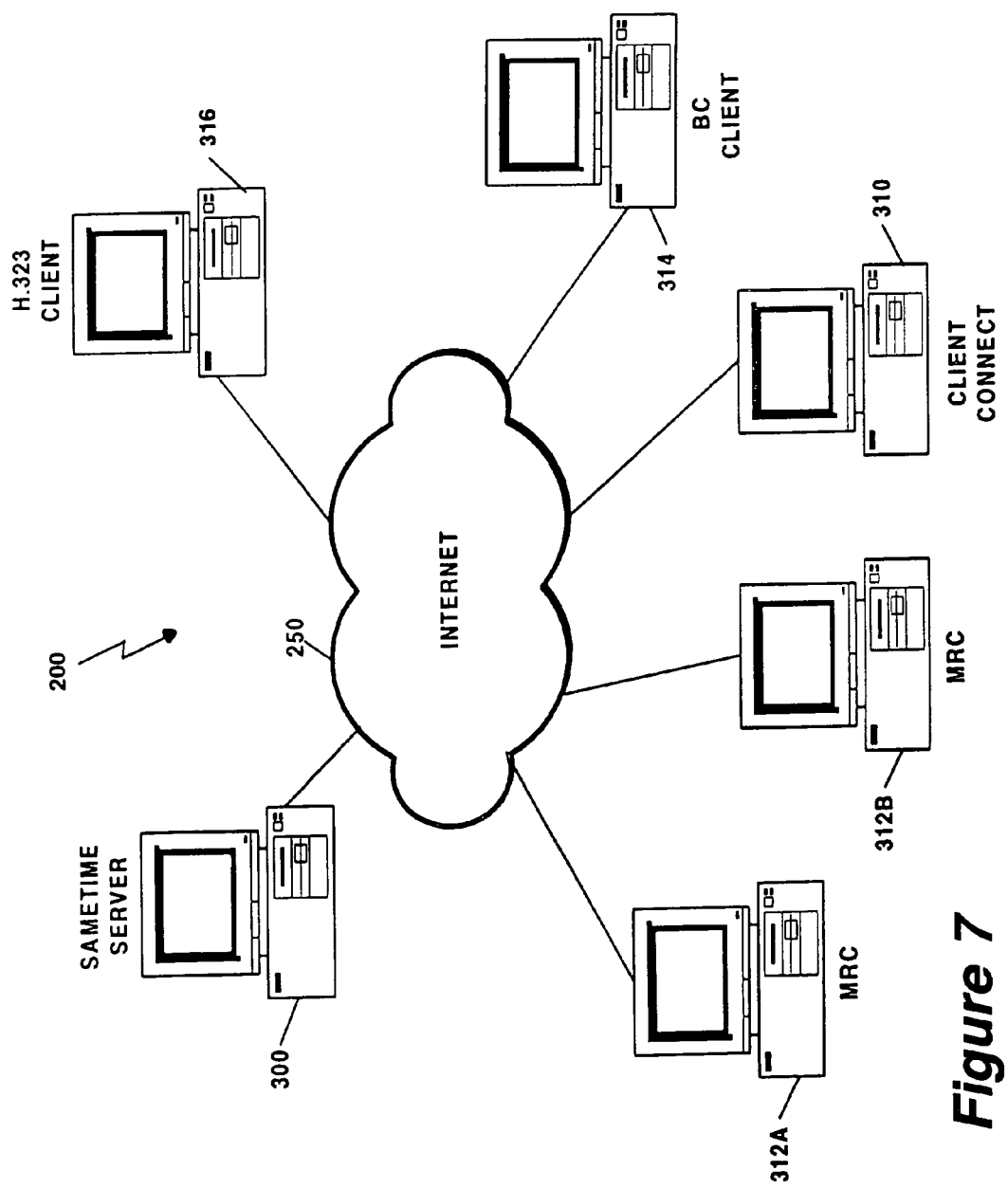
FIG. 7-8 are conceptually illustrate the functional components of a collaborative communications system in accordance with the present invention.

FIG. 7 illustrates a network environment in which the invention may be practiced, such environment being for exemplary purposes only and not to be considered limiting. Specifically, a packet-switched data network 200 comprises a Sametime server 300, a plurality of Meeting Program Client (MRC) client processes 312A-B, a Broadcast Client (BC) client 314, an H.323 client process 316, a Sametime Connect client 310 and an Internet network topology 250, illustrated conceptually as a cloud. One or more of the elements coupled to network topology 250 may be connected directly or through Internet service providers, such as America On Line, Microsoft Network, Compuserve, etc.

The Sametime MRC 312, may be implemented as a thin mostly Java client that provides users with the ability to source/render real-time audio/video, share applications/whiteboards and send/receive instant messages in person to person conferences or multi-person conferences. The Sametime BC 314 is used as a "receive only" client for receiving audio/video and shared application/whiteboard data that is sourced from the MRC client 312. Unlike the MRC client, the BC client does not source audio/video or share applications. Both the MRC and BC clients run under a web browser and are downloaded and cached as need when the user enters a scheduled Sametime audio/video enabled meeting, as explained hereinafter in greater detail.

In the computer system on which any of Sametime client processes 310, 312, 314, and 316 is executing, a sound/video card, such as card 197 accompanying the computer system 100 of FIG. 1, may be an MCI compliant sound card while a communication controller, such as controller 190 of FIG. 1, may be implemented through either an analog digital or cable modem or a LAN-based TCP/IP network connector to enable Internet/Intranet connectivity.

Server 300 may be implemented as part of an all software application which executes on a computer architecture similar to that described with reference to FIG. 1. Server 300 may interface with Internet 250 over a dedicated connection, such as a T1, T2, or T3 connection. The Sametime server is responsible for providing interoperability between the Meeting Room Client and H.323 endpoints. Both Sametime and H.323 endpoints utilize the same media stream protocol and content differing in the way they handle the connection to server 300 and setup of the call. The Sametime Server 300 supports the T.120 conferencing protocol standard, published by the ITU, and is also compatible with third-party client H.323 compliant applications like Microsoft's Net-Meeting and Intel's ProShare. The Sametime Server 300 and Sametime Clients work seamlessly with commercially available browsers, such as NetScape Navigator version 4.5 and above, commercially available from America On-line, Reston, Va.; Microsoft Internet Explorer version 4.01 service pack 2 and above, commercially available from Microsoft Corporation, Redmond, Wash. or with Lotus Notes, commercially available from International Business Machines Corporation, Lotus Brand Software Division, Cambridge, Mass.

Figure 8:
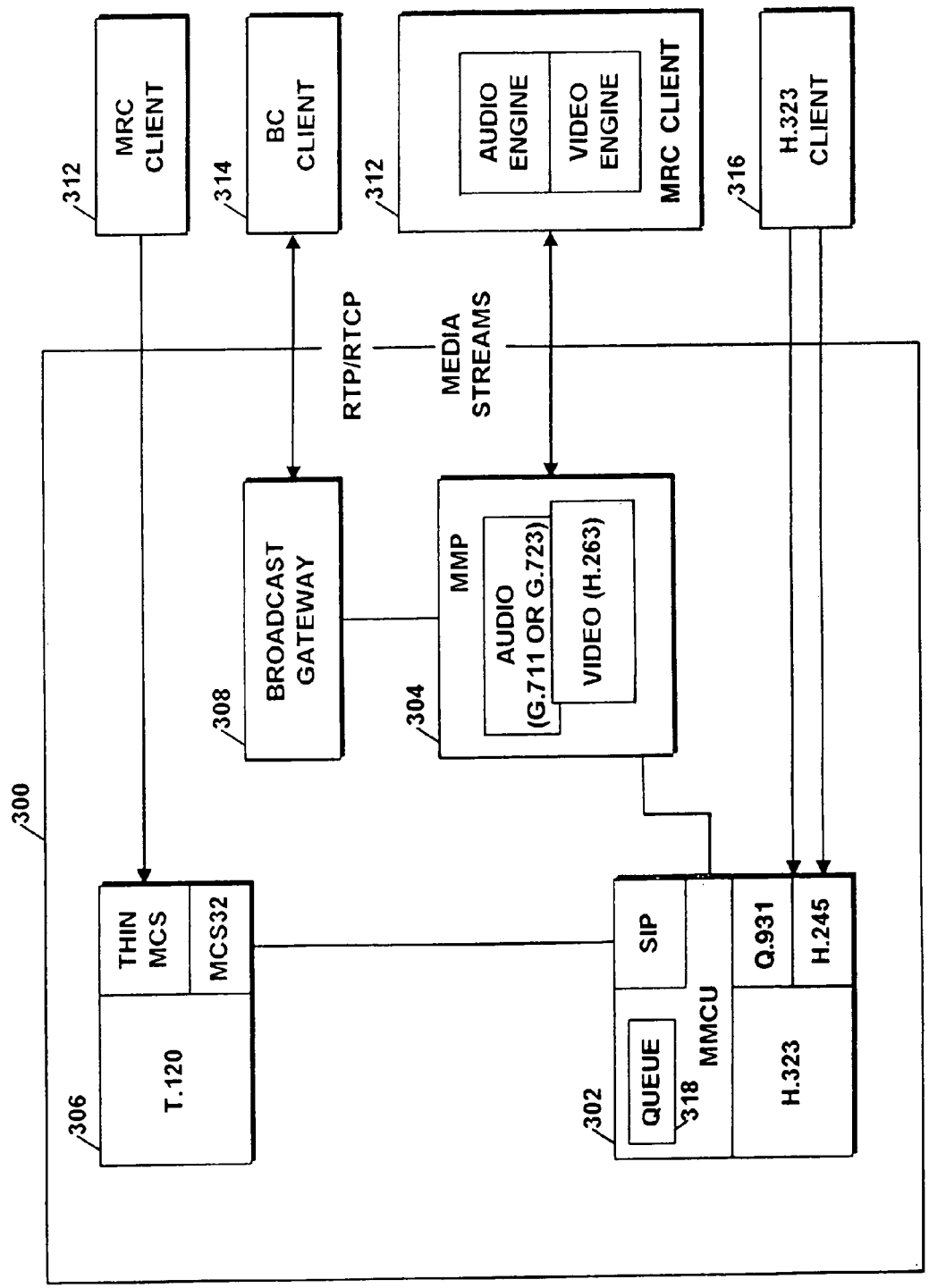

FIG. 8 illustrates conceptually a block diagram of a Sametime server 300 and MRC Client 312, BC Client 314 and an H.323 client 316. As illustrated, both MRC Client 312 and MMP 304 include audio and video engines, including the respective audio and video codecs. The present invention effects the video stream forwarded from a client to MMP 304 of server 300.

In the illustrative embodiment, the Sametime clients includes a video engine which is capable of capturing video data, compressing the video data, transmitting the packetized audio data to the server 300, receiving packetized video data, decompressing the video data, and playback of the video data. Further, the Sametime MRC client includes an audio engine which is capable of detecting silence, capturing audio data, compressing the audio data, transmitting the packetized audio data to the server 300, receiving and decompressing one or more streams of packetized audio data, mixing multiple streams of audio data, and playback of the audio data. Sametime clients which are capable of receiving multiple audio streams also perform mixing of the data payload locally within the client audio engine using any number of known algorithms for mixing of multiple audio streams prior to playback thereof. The codecs used within the Sametime clients for audio and video may be any of those described herein or other available codecs.

The Sametime MRC communicates with the MMCU 302 for data, audio control, and video control, the client has a single connection to the Sametime Server 300. During the initial connection, the MMCU 302 informs the Sametime MRC client of the various attributes associated with a meeting. The MMCU 302 informs the client process which codecs to use for a meeting as well as any parameters necessary to control the codecs, for example the associated frame and bit rate for video and the threshold for processor usage, as explained in detail hereinafter. Additional information regarding the construction and functionality of server 300 and the Sametime clients 312 and 314 can be found in the previously-referenced co-pending applications.

It is within this framework that an illustrative embodiment of the present invention is being described, it being understood, however, that such environment is not meant to limit the scope of the invention or its applicability to other environments. Any system in which video data is captured and presented by a video encoder can utilize the inventive concepts described herein.

Assistance Process

Figure 9:
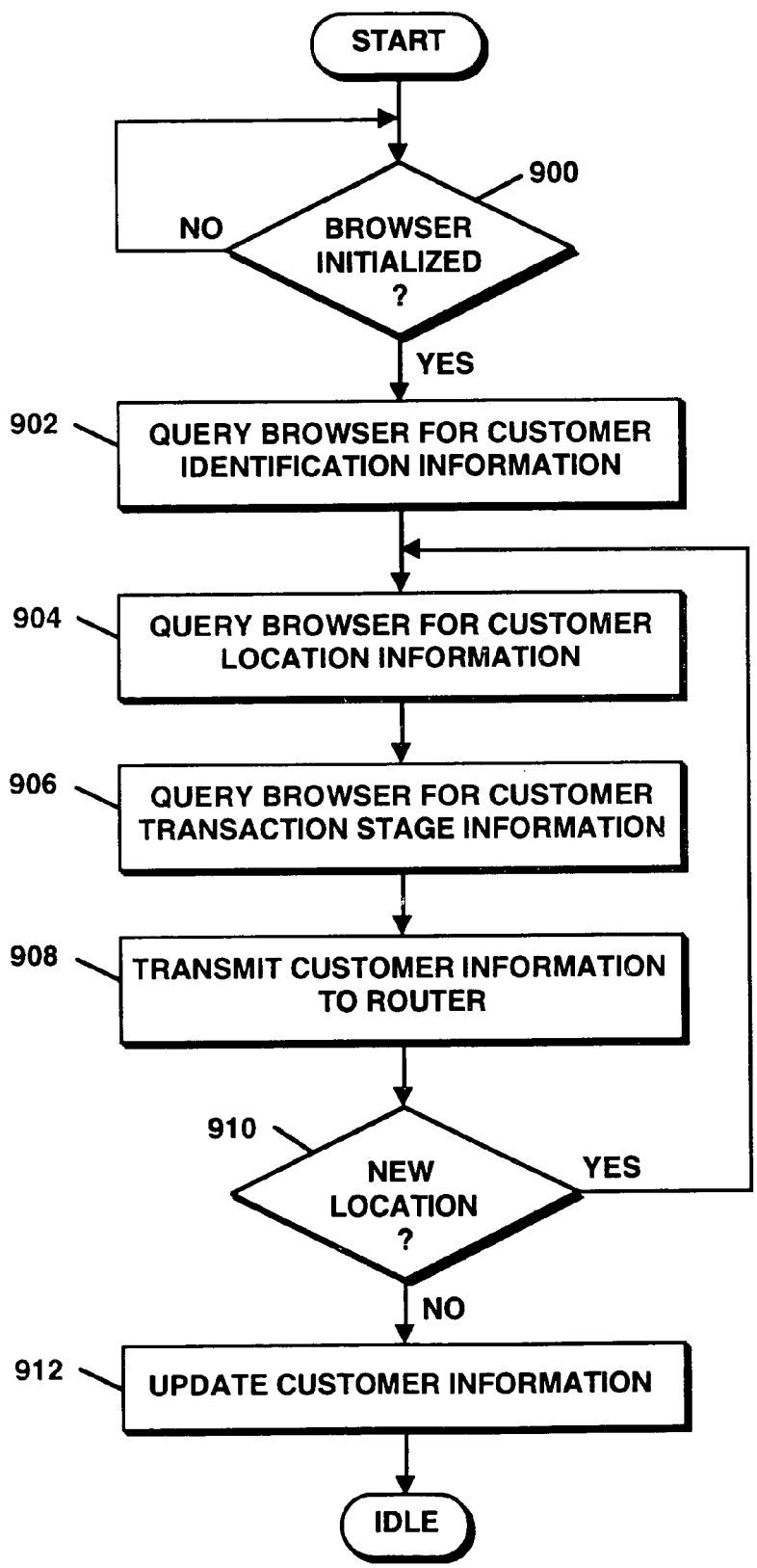
FIG. 9 is a flow chart illustrating the process steps performed by the monitoring applet of the present invention.

Having described the components of the system in which the inventive concepts may be implemented, the process is described hereafter with reference to FIGS. 9-C. Specifically, applet 430 may be shipped fully integrated within any number of commercial browsers and/or collaborative communication applications, such as SAMETIME. In such instances, applet 430 functions seemlessly with respect to the customer. Alternatively, upon visiting a specific page of a web server which offers assistance in accordance with the disclosure herein, a customer will be queried if they require assistance. If responding affirmatively, applet 430 may be downloaded from the web server, typically the web server of the vendor, for automatic installation on the customer system. In such instances, applet 430 interacts with the web browser on the customer's assistance through a series of calls, typically through publicly-published APIs, in the web browser interface.

Referring to FIG. 9, the process steps performed by customer monitoring applet 430 are illustrated. Customer monitoring applet 430 first determines whether the web browser 440 associated with the customer system is executing, as illustrated by decisional step 900. If not, the applet 430 remains idle. If browser 440 is executing, applet 430 queries the browser for information relative to the customer and the browsing activity, as illustrated by procedural steps 902, 904 and 906. In procedural step 902, applet 430, and specifically the monitoring module 432, queries web browser 440 for any information exchanged with a particular web server and useful for identifying the customer, such as the customer name and customer identification data. In step 904, applet 430 queries web browser 440 for information relating to the location of the customer process, such as the URL of the web page to which web browser process 440 is currently connected. In addition, monitoring module 432 queries the web browser process 440 for stage-related information and other data indicating the progress of the customer in a transaction. Such stage-related information may include any of the credit card delivery address type of good codes, special status of a customer account, number of items in the customer shopping cart, etc., or any other of the data storable in data structure 550 of database 280, as illustrated by procedural step 906. Monitoring module 432 of applet 430 typically buffers the responses received from web browser 440, converts the data into the appropriate format for transmission over a network to route server 260. In the illustrative embodiment, the data illustrated in data structure 450 may be represented in XML format and transmitted to route server 260 over a network using the TCP/IP protocol, as illustrated by procedural step 908. The information contained in data structure 450 compiled by applet 430 may be transmitted, in an alternate embodiment, directly to database server 270 over a public network, rather than router server 260, for storage in database 280. Monitoring module 432 then determines whether or not web browser process 440 is still within the same transaction, typically by monitoring the URL of the current page with that of the former web page to determine if browser 440 is still connected to the same web site, as illustrated by decisional step 910. If so, applet 430 periodically updates the information within data structure 450 and retransmits the same to router server 260, as illustrated by step 912, which may encompass the same processes, as illustrated in blocks 902-908. If, however, web browser process 440 is connected to a different web site indicating a substantial change in the browsing process, monitoring module 432 will begin the same process described previously with respect to steps 904-912. This process continues as long as the browser 440 is executing, otherwise applet 430 remains idle.

Figure 10A:
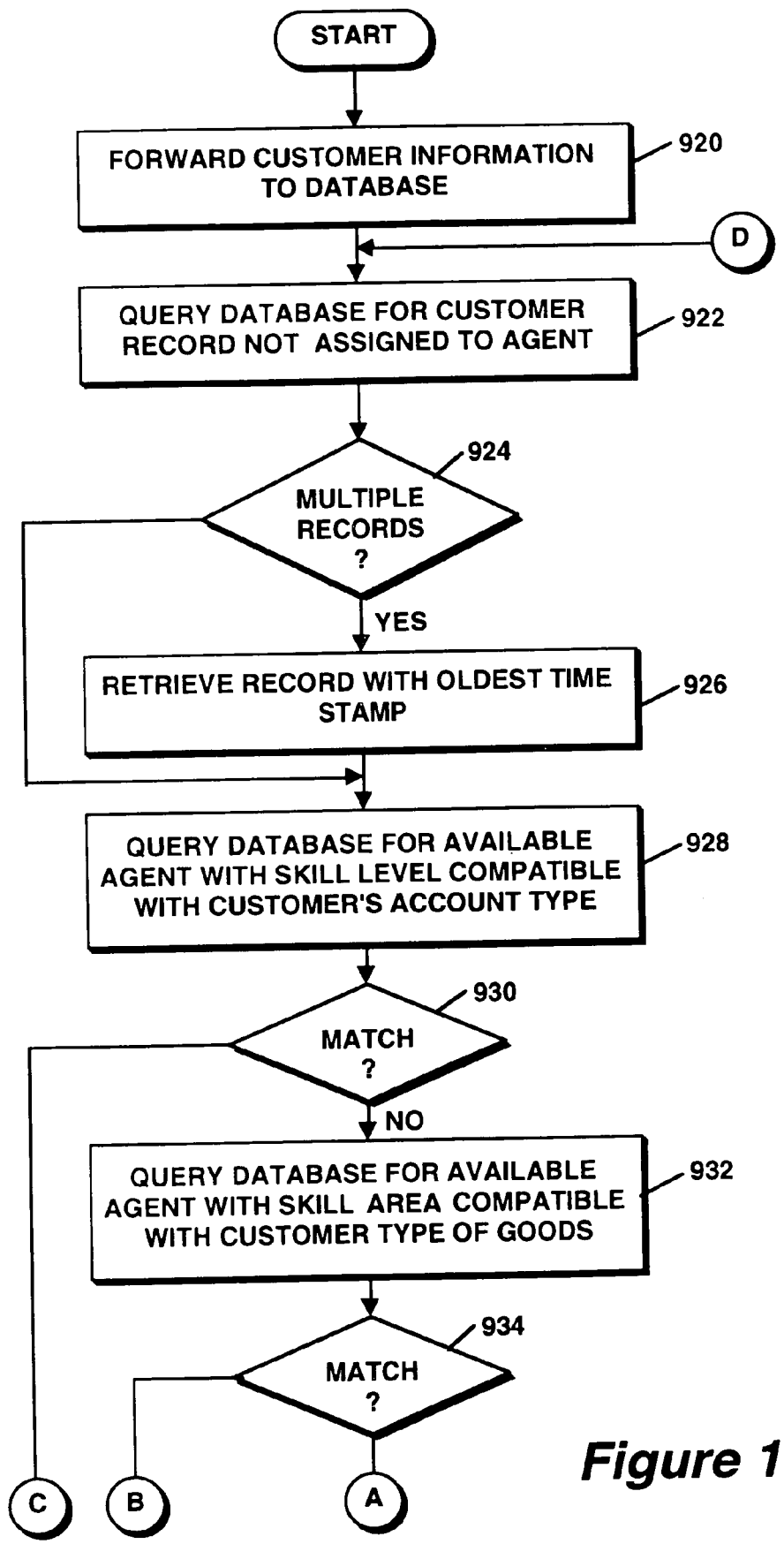
FIGS. 10A-B are flow charts illustrating the process steps performed by the router server of the present invention.
Figure 10B:
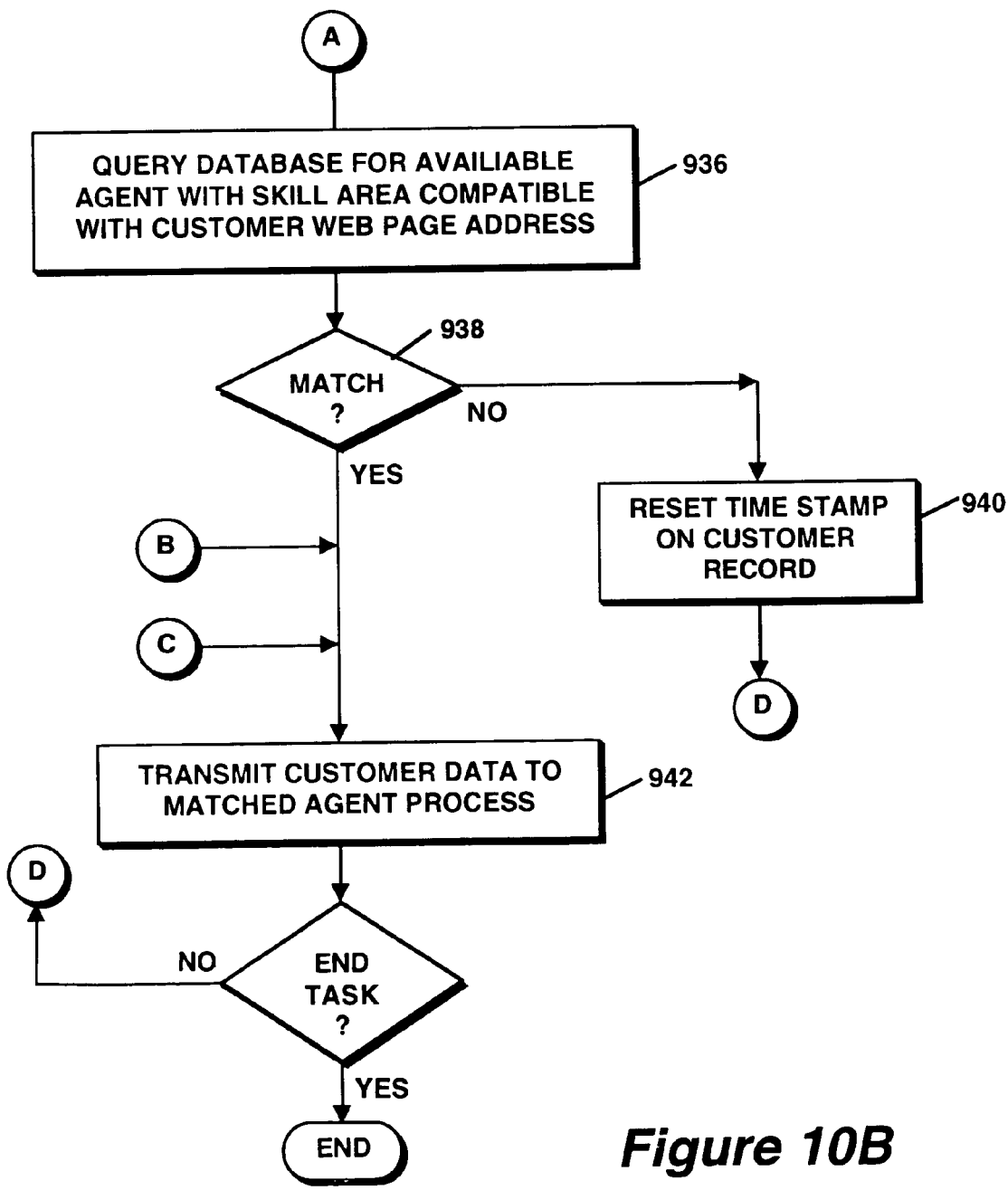

FIGS. 10A-B illustrate the process performed by router server 260 in accordance with the present invention. The primary purpose of router server 260 is to match one of a plurality of on-line agents, whose relevant data is stored in customer database 280. Depending on the network implementation of the present invention, the data identifying a potential customer, as described with reference to data structure 450, may be sent directly from a customer system to router server 260 or directly to database server 270 and database 280. In the event that the data is provided from applet 430 to router server 260, router server 260 will receive the customer data in data structure 450 and forward the same onto database 280 via database server 270, as illustrated by procedural step 920. If the customer information is forwarded directly to database server 270, step 920 may be eliminated. The records used to hold information within databases 280 and 285 are time-stamped upon receipt of the data stored therein.

Next, the routing decision engine 265 within server 260 queries database server 270 for all customer records in which the current agent field 566 indicates that no agent is currently assigned to the customer, as illustrated by procedural step 922. If the query matches more than one record, routing engine 265 will utilize the matching record which has the oldest timestamp, as indicated by decisional step 924 and procedural step 926. The decision engine 265 examines the Customer Account Type field 562 of the customer record 550 within router server 260 then queries database 285 for all active agent record 590 within the database whose Agent Available field indicates that the agent is currently available and whose Skill Level field 576 is compatible with the Customer Account Type field 562 of the customer record 550, as illustrated by procedural step 928, in an attempt to match the most valuable customers with the most skilled agents. If no match occurs, as indicated by decisional step 930, the decision engine 265 then queries database 285 for all active agent records 590 within the database whose Skill Area field 574 matches the type of good field(s) 562a-n of the customer record 550, as indicated procedural step 932, in an attempt to find a match. To assist with the matching process the decision engine may utilize one of more rules that define relationships between skill areas and certain types of goods. For example, a rule may match the Skill Area code associated with outdoor equipment with TypeofGoods codes associated with either camping gear or outdoor sports. If no matches occur, as indicated by decisional step 934, according to the prior criteria or there are no goods within the customer's shopping cart or "basket", decision engine 265 then queries database 285 for all active agent records 590 within the database whose Skill Area field 574 compatible with the web page address field 556 of the customer record 550, as indicated procedural step 936, in an attempt to find a match. Again, to assist with the matching process the decision engine may utilize one of more rules that define relationships between certain web page addresses and certain Skill Areas. For example, a rule may match the Skill Area code associated with outdoor equipment with all or a part of the web page addresses or identifiers thereof of certain camping gear or outdoor sports vendors who have registered with the system. The rules utilized by decision engine 265 to assist in performing the above described matching operations may be stored in a local memory associated with router server 260 or may be stored remotely in one of databases 280 or 285.

If no match occurs with any of the above criteria, as indicated by decisional step 938, the customer record timestamp is updated, as illustrated by procedural step 940, and the process begins again with step 922. If a match occurs at any of decisional steps 930, 934 or 938, the data within customer record 550 is transmitted to the agent process associated with agent record 590, as illustrated by procedural step 942. Thereafter, the process begins again with step 922 and may continue as long as there are customer records in the data base that do not have an assigned agent process. The sequence of the above described process may also be implemented in a number of different ways while still utilizing the three matching criteria described above. Such a modification will be apparent from the disclosure contained herein.

Figure 11A:
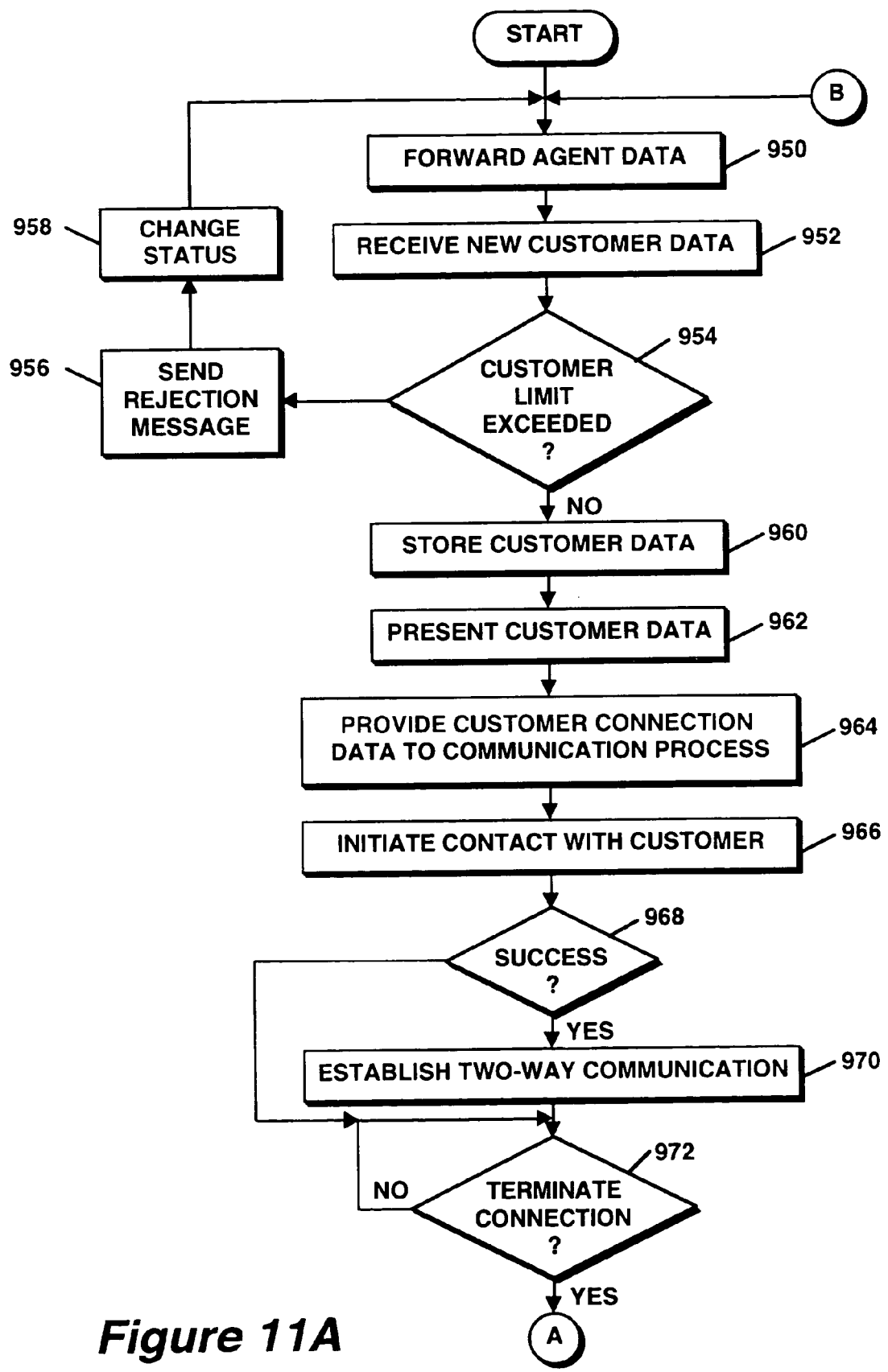
FIGS. 11A-B are a flow charts illustrating the process steps performed by the agent applet of the present invention.
Figure 11B:
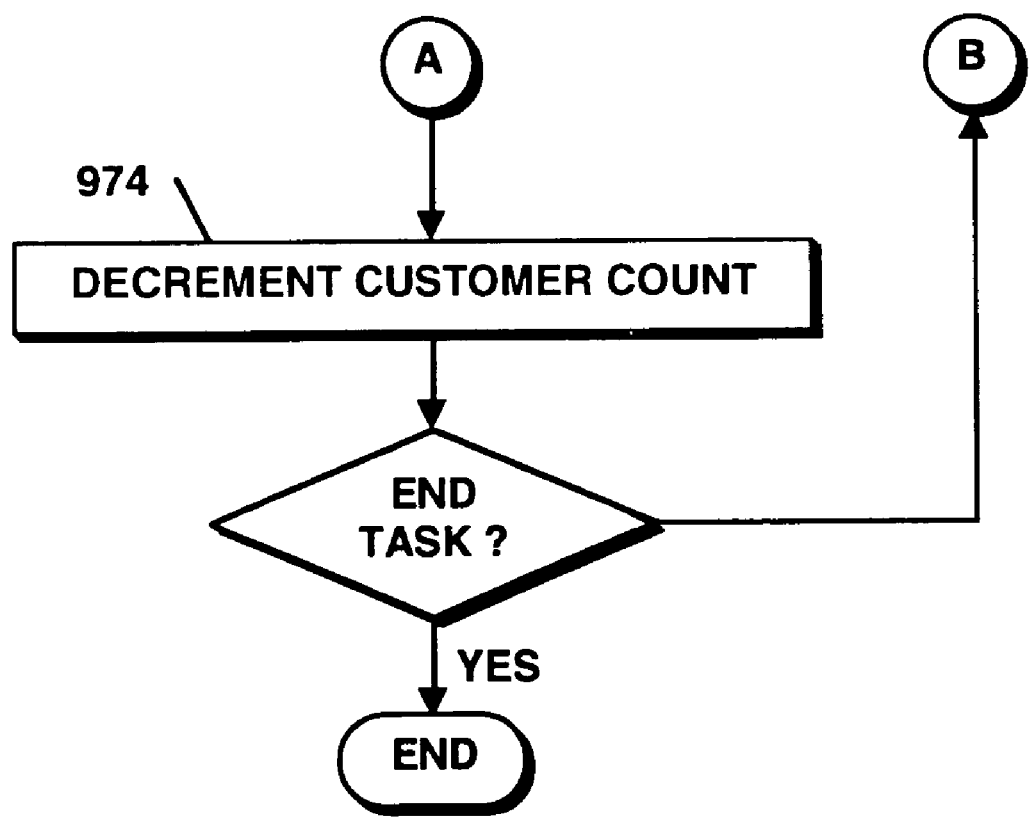

FIGS. 11A-B illustrate the process performed by agent applet 600 in accordance with the present invention. Initially, agent applet 600 executes on the agent computer system, which is typically located remotely from a customer system or the router server 260. In addition, the collaborative communication software 602 executes in conjunction with agent applet 600. Initially, upon invocation, agent applet 600 forwards data of the type described with reference to record 590 to either router server 260 for forwarding onto database 285 through LAN 290 or directly to database server 260 for storage in database 285, as indicated by procedural step 950. Next, using the customer information contained in database 280 and the information within database 285 regarding the plurality of online agent processes, router server 260 determines which of the agent processes is best suited to proactively provide assistance to a potential customer at a web browser process. Once a decision has been made, router server 260 forwards to the selected agent process the information associated with a particular customer, as reflected in record 550 of database 280. Such information is received by agent applet 600.

Upon receipt of the data related to a customer, agent applet 600 determines if its capacity for handling customer processes has been exceeded, as illustrated by procedural step 952 and decisional step 954. This process typically involves maintenance of a data variable indicating the current number of customers being assisted by the agent process and comparing the current value of the variable to a user-definable predetermined limit. If the limit is exceeded, the agent applet may reject the data associated with the new customer and send an updated record 590 to database 285 with the Agent Available field marked accordingly, as illustrated by procedural step 956 and 958. If, however, the number of agents currently handled is below the predetermined limit, the data associated with the new customer is accepted and stored locally within the agent system, as illustrated by procedural step 960. Agent applet 600 then presents the data or makes available for presentation through the operating system and graphic user interface currently executing on the agent system, the information associated with the customer, as indicated by procedural step 962.

Accordingly, the agent may study the information associated with an agent including the types of goods, where the customer is in the transaction process, and the amount of time the customer has spent at a particular web page, to determine whether assistance should be offered. If the agent offers assistance to a customer process, agent applet 600 will provide all the relevant contact information to the collaborative communication software 600 necessary to initiate contact, including the URL of the website to which the customer's web browser process is connected and an Internet protocol address at which the customer system is currently connected to a network, as illustrated by procedural step 964. The collaborative communication software 602 then utilizes the information supplied by agent applet 600 to initiate contact with the customer system which includes either the same or a compatible collaborative communication software application executing thereon as illustrated by procedural step 966 and decisional step 968. The communication software 602 will determine from the customer information the nature of the types of communication, e.g. whiteboarding, collaborative browsing, rule-time audio/video streaming, etc. Data structure 450 used to identify the customer may additionally include fields describing the collaborative communication software of either the browser or a separate application through which the agent process may communication with the customer. Typically, the initiation of communication from the agent will be in the form of a query such as text chat "Would you like some assistance in making your selection?" or a similar query.

If the customer responds positively, the customer and agent establish communication in whatever format their respective communication software allows, as illustrated by procedural step 970. For example, the potential customer and agent may be able to simultaneously conduct text chat between their respective systems as well as browse collaboratively through the exchange of the appropriate web page addresses and text. Alternatively, the potential customer and agent may be able to conduct a real-time audio conversation while browsing collaboratively.

Once the communication between the agent and potential customer is terminated, the applet 600 will then decrement the variable maintaining the number of customers currently monitored by the agent, as illustrated by decisional step 972 and procedural step 974. The process then will return to step 950 where the agent applet will then again forward its data to either database server 270 or router server 260 for updating database 285.

In light of the foregoing description, the reader will appreciate that the inventive system described herein enables a number of agents to proactively offer assistance to potential customers browsing vendor websites based on an automated matching of the agent's particular skill level with the type of goods and/or skill of the customer connected to the website.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from International Business Machines Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Although an all software embodiment of the invention was described, it will be obvious to those skilled in the art that the invention may be equally suited for use with video system the use firmware or hardware components to accelerate processing of video signals. Such modifications to the inventive concept are intended to be covered by the appended claims.

What is claimed is:

1. In a computer system having a processor, memory and network interface and being operatively coupled over a computer network to one or more web browsers processes, a method comprising:
    (A) receiving information from a monitoring process executing in association with one of the web browser processes, the information identifying the web browser process and at least a portion of a web site to which said one web browser process is connected;
    (B) determining from the information identifying the web browser process, which of a plurality of on-line agent processes should establish a communication connection with the web browser process;
    (C) transmitting the information identifying the web browser process to said one agent process; and
    (D) establishing a communication connection between the web browser process and said one agent process using over the computer network the information identifying the web browser process, while the web browser process is connected to the web site.

2. The method of claim 1 wherein the communication connection between the web browser process and said one agent process comprises any of a text chat, real-time audio, real-time video, and collaborative browsing communication connection.

3. The method of claim 1 wherein the information identifying the web browser process comprises any of customer id, web page URL, TypeOfGoods, Customer status, and Current Agent information.

4. A computer program product for use with a computer system operatively coupled over a computer network to one or more web browsers processes, the computer program product comprising a computer useable medium having embodied therein program code comprising:
   A) router program code for receiving information from a monitoring process executing in association with one of the web browser processes, the information identifying the web browser process and at least a portion of a web site to which said one web browser process is connected;
   B) program code for determining from the information identifying the web browser process, which of a plurality of on-line agent processes should establish a communication connection with the web browser process;
   C) program code for transmitting the information identifying the web browser process to said one agent process; and
   D) program code for establishing a communication connection between the web browser process and said one agent process over the computer network using the information identifying the web browser process, while the web browser process is connected to the web site.

5. An apparatus for use with a computer system having a processor and network interface and being operatively coupled over a computer network to one or more web browsers processes, the apparatus comprising:
   (A) a memory for maintaining information associated with a plurality of on-line agent processes;
   (B) program logic for receiving information from a monitoring process executing in association with one of the web browser processes, the information identifying the web browser process and at least a portion of a web site to which said one web browser process is connected;
   (C) program logic for determining from the information identifying the web browser process, and information associated with a plurality of on-line agent processes which of the plurality of on-line agent processes should establish a communication connection with the web browser process; and
   (D) program logic for transmitting the information identifying the web browser process to said one agent process, while the web browser process is connected to the web site.

6. In a computer system having a processor, memory and network interface and being operatively coupled over a computer network to one or more customer web browsers processes, a method comprising:
   (A) maintaining, in the memory, information associated with a plurality of on-line agent processes;
   (B) receiving information from a monitoring process executing in association with one of the customer web browser processes, the information identifying the web browser process and at least a portion of a web site to which said one web browser process is connected;
   (C) determining from the information identifying the web browser process, and information associated with a plurality of on-line agent processes which of the plurality of on-line agent processes should establish a communication connection with the web browser process, while the web browser process is connected to the web site; and
   (D) transmitting the information identifying the web browser process to said one agent process.

7. The method of claim 6 wherein the information identifying the customer web browser process comprises any of customer id, web page address, type of goods, customer status, and current agent information.

8. The method of claim 7 wherein the information identifying the one of the agent processes comprises any of agent skill area, agent skill level and agent availability.

9. The method of claim 8 wherein the information identifying one of the agent processes comprises the agent skill level and wherein B further comprises:
   (B1) comparing the agent skill level with the customer status.

10. The method of claim 8 wherein the the information identifying one of the agent processes comprises the agent skill area and wherein B further comprises:
    (B1) matching a value of agent skill area with one of the type of goods and the web page address.

11. A computer program product for use with a computer system operatively coupled over a computer network to one or more web browsers processes, the computer program product comprising a computer useable medium having embodied therein program code comprising:
    A) router program code for receiving information from a customer process executing in association with the web browser process, the information identifying the customer process and at least a portion of a web site to which the associated web browser process is connected;
    B) program code for determining from the information identifying the customer process, which of a plurality of on-line agents is appropriate to render assistance to the customer process, while the web browser process is connected to the web site; and
    C) program code for transmitting the information identifying the customer process to agent program code.

12. In a computer system having a processor, memory and network interface and being operatively coupled over a computer network to a router process and capable of executing a collaborative communication process and a web browser process, a method comprising:
    (A) monitoring a web site accessed by a the web browser process;
    (B) forwarding to the router process information identifying the web browser process and at least a portion of the web site to which the web browser process is connected, while the web browser process is connected to the web site.

13. A computer program product for use with a computer system operatively coupled over a computer network to a router process and capable of executing a collaborative communication process and a web browser process, the computer program product comprising a computer useable medium having embodied therein program code comprising:
    (A) program code for monitoring a web site accessed by a the web browser process;
    (B) program code for forwarding to the router process information identifying the web browser process and at least a portion of the web site to which the associated web browser process is connected, while the web browser process is connected to the web site.

14. In a computer system having a processor, memory and network interface and being operatively coupled over a computer network to a router process and one or more customer systems executing a communication process and a web browser process, a method for offering assistance comprising:
- (A) receiving the information identifying the customer system from the router process; and
- (B) initiating a communication connection with the customer system over the computer network, while the customer system is connected to a web site, using the communication process and the information identifying the customer system.

15. The method of claim 14 wherein (B) comprises:
- (B1) initiating a text chat communication connection with the customer system.

16. The method of claim 14 wherein (B) comprises:
- (B1) initiating a collaborative browsing communication connection with the customer system.

17. The method of claim 14 wherein (B) comprises:
- (B1) initiating a real-time audio communication connection with the customer system.

18. The method of claim 17 wherein (B) comprises:
- (B2) initiating a real-time video communication connection with the customer system.

19. The method of claim 17 further comprising:
- (C) transmitting to the router process data identifying other customer systems with which a collaborative communication connection is currently established.

20. The method of claim 17 wherein the information identifying the customer browser process comprises any of customer id, web page URL, TypeOfGoods, Customer status, and Current Agent information.

21. A computer program product for use with a computer system operatively coupled over a computer network to a router process and one or more customer systems executing a collaborative communication process and a web browser process, the computer program product comprising a computer useable medium having embodied therein program code comprising:
- (A) program code for receiving the information identifying the customer system from a router process; and
- (B) program code for initiating a communication connection with the customer system over the computer network, while the customer system is connected to a web site, using the collaborative communication process and the information identifying the customer system.

22. The method of claim 12 wherein the information identifying the web browser process comprises any of customer id, web page address, type of goods, customer status, and current agent information.

* * * * *